(12) United States Patent
Russell et al.

(10) Patent No.: US 6,480,635 B1
(45) Date of Patent: Nov. 12, 2002

(54) IDENTIFICATION AND LOCATION OF FIBER OPTIC CABLES

(75) Inventors: Stuart John Russell, Bristol (GB); Andrew Biggerstaff Lewis, Bristol (GB); John Philip Dakin, Hampshire (GB)

(73) Assignee: Radio Detection Limited, Bristol (GB)

( * ) Notice: Subject to any disclaimer, the term of this patent is extended or adjusted under 35 U.S.C. 154(b) by 0 days.

(21) Appl. No.: 09/554,559

(22) PCT Filed: Sep. 21, 1999

(86) PCT No.: PCT/GB99/03146

§ 371 (c)(1), (2), (4) Date: May 15, 2000

(87) PCT Pub. No.: WO00/17692

PCT Pub. Date: Mar. 30, 2000

(30) Foreign Application Priority Data

Sep. 21, 1998 (GB) .............................................. 9820535

(51) Int. Cl.⁷ .............................. G02B 6/27; G02B 6/04
(52) U.S. Cl. ....................... 385/11; 385/147; 356/73.1
(58) Field of Search .................. 385/11, 147; 356/4.01, 356/5.01, 5.14, 73.1

(56) References Cited

U.S. PATENT DOCUMENTS

| | | | |
|---|---|---|---|
| 5,202,746 A | * 4/1993 | Sentsui et al. ......... | 250/227.17 |
| 5,329,348 A | * 7/1994 | Nimura et al. ............ | 356/73.1 |
| 5,331,392 A | * 7/1994 | Fujisaki et al. ........ | 250/227.17 |
| 5,379,357 A | * 1/1995 | Sentsui et al. ......... | 250/227.17 |
| 5,576,871 A | 11/1996 | Nimura | |

FOREIGN PATENT DOCUMENTS

| | | |
|---|---|---|
| EP | 0 390 341 A1 | 10/1990 |
| EP | 0 390 341 A1 * | 10/1990 |
| EP | 0 513 381 A1 | 11/1992 |
| EP | 0 639 763 A1 * | 2/1995 |

* cited by examiner

*Primary Examiner*—Akm E. Ullah
*Assistant Examiner*—Michelle R. Connelly-Cushwa
(74) *Attorney, Agent, or Firm*—Baker & Hostetler LLP

(57) ABSTRACT

In order to identify a fiber optic cable (10) a beam (14) of polarized light is caused to pass down the cable to a first site (A) at which an electromagnetic field (24) is applied to the cable (10). The electromagnetic field (24) traverses the cable (10) in an essentially transverse direction and has a time-varying component orientated along the length of the cable (10) at the first site (A), with the component varying so that the line integral thereof along the cable (10) is non-zero. This results in a variation in the polarization of the light, which can then be detected by a polarization discriminator (20) at a second site (B), thereby to identify the cable (10).

8 Claims, 3 Drawing Sheets

IDENTIFICATION AND LOCATION OF FIBER OPTIC CABLES

BACKGROUND OF THE INVENTION

1. Field of the Invention

The present invention relates to the identification and location of fiber optic cables.

2. Summary of the Prior Art

There are many methods known for identification and location of underground objects. Many of these work by the detection of a magnetic field that is generated by electrical current carried by the underground object. These methods are effective for such objects as metal pipes, electrical cables and fiber optic cables which carry a metal sheath. The electric current may already be carried by the underground object, ie. in an electrical cable, or may be applied thereto, eg. by applying a voltage to the sheath of a fiber optic cable, or induced by applying a magnetic field to the underground object. However many fiber optic cables do not contain any conducting material, and therefore the known methods of location and identification of underground objects cannot be used.

The present invention provides a system for the identification and location of fiber optic cables which makes use of the Faraday Effect. In EP-A-0390341, a method and apparatus are described for identifying an optical fiber carrying a beam of polarised light. If a magnetic field is applied to the beam with a component axial to the direction of polarised light, the polarisation of the light is rotated by this axial component. EP-A-0390341 thus proposes applying a magnetic field with an axial component to the fiber, and detecting the change in polarisation of the light at a remote location. In this way, it can be confirmed that the cable in which the change in polarisation is detected is the same cable to which the magnetic field with an axial component is applied.

The magnetic field may be applied to the fiber optic cable in a number of ways. Firstly, it can be generated above ground, using coils or spinning magnets. This method has the disadvantage that the magnetic field may affect the polarisation of light carried in other fiber optic cables nearby.

Alternatively, coils may be placed around the cable and the signal from the signal generator applied directly to the coils. However, unless the coils are actually wound around the fiber, or effectively configured that way using a split coil with a connector strip each side of the fiber, the line integral of the net magnetic field component along the axis of the fiber will be zero or negligible. This effect is observed because the field at one point along the cable will be cancelled out by a reverse field at a second point along the cable. By Ampere's law, the line integral of the magnetic field around an arbitrarily chosen path is proportional to the net electric current enclosed by the path. Thus, such use of an electromagnetic coil will not generate a detectable modulation of the polarisation of light.

SUMMARY OF THE INVENTION

The present invention therefore provides a method of effecting Faraday rotation of light travelling through a fiber optic cable. The method uses an arrangement in which an electromagnetic field is propagated towards the fiber, such that it traverses the fiber in an essentially transverse direction with a time-varying magnetic field component oriented along the length of the fiber, that component varying such that the line integral thereof along the cable is non-zero.

The light must have a degree of polarisation which is sufficiently great to be detectable. In principle, the light should be wholly polarised, but this is not always possible to achieve and a suitably high degree of polarisation is sufficient.

It is also possible, in principle, for the frequency of the electromagnetic field to have any value. However, the frequency affects the size of the antenna which is to generate it, and so radio frequencies, e.g. in the range 10 kHz to 200 MHz, preferably in the range 10 MHz to 200 MHz, may be used.

The field can be generated by any suitable radio frequency (RF) or microwave antenna, such as, for example, a simple dipole antenna. The propagating field causes the plane of polarisation of light passing along the cable to be modified, but without exhibiting problems due to the field reversal effect described above. Note that the size of the antenna needed increases with decrease in frequency, which is why radio frequencies are preferred.

Preferably, the antenna is aligned to extend in a plane which is parallel or substantially parallel to the longitudinal axis of the cable, but offset from it, with the axis of the or each dipole of the antenna oriented perpendicularly to the axis of the cable. Preferably, an array of antennas is used, which generates a strong beam directed towards, or focussed onto, the fiber optic cable.

Suitable arrays include a Yagi linear array, or an array of dipoles in which each dipole lies on part of a conceptual cylindrical surface encircling the fiber optic cable, with the axis of each dipole being aligned perpendicular to the direction of the fiber axis. Alternatively, a parabolic dish antenna can be used to form a collimated RF or microwave beam crossing the cable, with its magnetic field direction aligned with the direction of the cable.

Thus, at its simplest, the present invention may involve the input to the fiber of plane polarised light, the application of the electromagnetic field with a component with a non-zero line integral, and the detection in the resulting change of polarisation.

However, in some situations, this simple arrangement may not be wholly successful. As a plane polarised light beam propagates down a fiber optic cable, its state of polarisaton may vary. The state of polarisation is the relationship between the magnetic and electric components of the electromagnetic field of the light and these are affected by geometrical factors, and also the inherent birefringence of the fiber. It is possible for the state of polarisation to vary such that an initially plane polarised beam is, at some point along the fiber, circularly polarised. If the point of application of the electromagnetic field with a component with a non-zero line integral happens to be such a point where the light is circularly polarised, the effect of the present invention cannot be detected.

It is therefore important that the state of polarisation at the point of application of the electromagnetic field is not circularly polarised. However, this is not always possible to achieve, since there are many factors which affect the state of polarisation along the fiber.

Therefore, a development of the present invention proposes to overcome this problem by applying a modulation to the state of polarisation, which modulation changes with time. The modulation causes the state of polarisation to vary at the point of modulation, and hence at all subsequent positions along the fiber. Therefore, even if the point application of the electromagnetic field happened to coincide with a circularly polarised state of polarisation at some time, the modulation would ensure that, at some later time, the beam was not circularly polarised since its state of polarisation would have changed due to the modulation.

The modulation could be wholly random, or could be regular as desired. Whichever is chosen, the effect is that the electromagnetic field is applied to the non-circularly circularly polarised state at least for part of the modulation cycle.

Means for achieving polarisation modulation are know, and may include mechanically perturbing the fiber in a cyclable or randomly-varying manner, by applying an axial or bending strain, or using a electro-optic or magneto-optic modulator with a time-varying electrical drive signal.

The modulation applied to change the state of polarisation should be sufficiently different from the frequency of the electromagnetic field which is applied to be separable by suitable signal processing. It is possible for the modulation to have a similar frequency to the electromagnetic field which is applied to the fiber, but for signal processing reasons it is preferable for them to be different. Thus, the polarisation modulator may typically operate at frequencies from a few Hz to a few kHz, but if the electromagnetic field has a frequency in the range 10 MHz to 200 MHz, it would be possible for the modulation frequency to be as high as a 100 kHz and still easily be separable by signal processing.

BRIEF DESCRIPTION OF THE DRAWINGS

Embodiments of the invention will now be discussed in detail, by way of example, with reference to the accompanying drawings in which.

DETAILED DESCRIPTION

Figure 1:
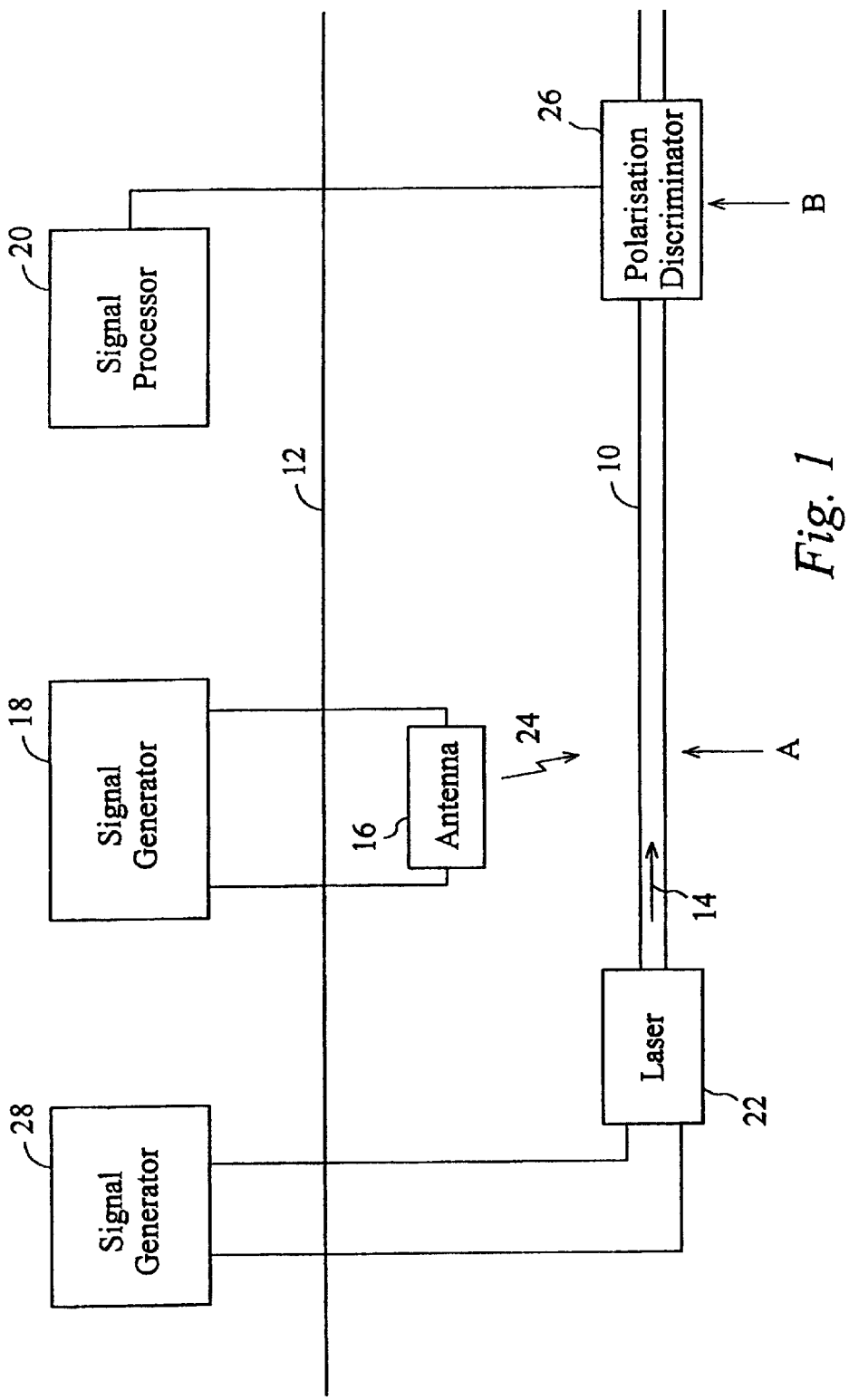
FIG. 1 is a schematic drawing of a first embodiment of system for modifying the polarisation state of light transmitted through a fiber optic cable.

FIG. 1 shows a fiber optic cable 10, the location of which is to be determined. The fiber optic cable carries polarised light 14 which is produced by a laser source 22. The laser is preferably a semiconductor diode laser, especially one of the distributed feedback (DFB) kind. Alternatively, a 1.5 micron HeNe or other gas laser may be used, or a 1.5 micron region Erbium fiber or Er-glass laser. An amplifier, such as an Er-fiber amplifier, may optionally be included to amplify the signal emitted by the laser.

At location A, a magnetic field is applied to the fiber optic cable 10. This magnetic field is generated by a propagating electromagnetic field 24 emitted from an antenna or antenna array 16. The electromagnetic field is directed towards the cable such that it traverses the fiber optic cable 10 in an essentially transverse direction. The propagating field 24 has a non-zero, time-varying line integral of magnetic field component which is aligned with the longitudinal axis of the cable. The effect of this component is to cause a Faraday rotation of the polarisation of the light, which rotation depends on the integral along the cable of the magnetic field experienced by the light. Thus, if that integral is zero, the net effect on the light is also zero so that no measurable Faraday rotation will be imparted to the light.

The antenna 16 may be an RF or microwave antenna, or a parabolic dish antenna. An array of antennas may be used, to provide a greater intensity of, or a focussed, electromagnetic field. In addition, the individual elements of such an array may be given individually discernible signals, e.g. by frequency domain or time domain multiplexing. This may then enable the location of the cable to be determined relative to the stationary array during the possibly significant time required to take the required measurements.

The antenna could take many forms, as the only requirement is to apply a magnetic field with a non-zero line integral, along the direction of the fiber cable to be located. Possible examples of antenna for this are:

(i) A field-coil, or solenoid, wrapped around the test fiber cable.

(ii) A simple dipole antenna held near the cable (optimum direction of the axis of the dipole conductors being in a plane lying perpendicular to the axis of the fiber cable to be located, and with the fiber cable lying in the plane that symmetrically bisects the two metal elements of the dipole antenna).

(iii) A directional Yagi dipole array, pointing towards the fiber cable, with all the metal elements of the dipole array lying essential in the plane perpendicular to the fiber cable to be located.

Clearly, many other forms of antennae, such as parabolic reflectors, could be used.

Figure 2:
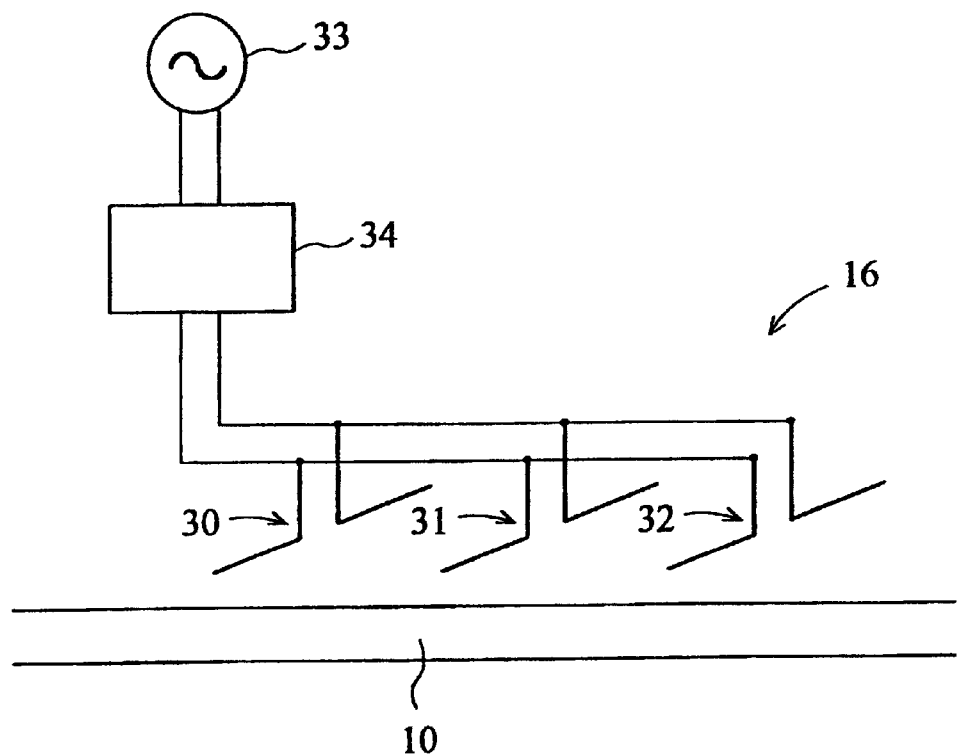
FIG. 2 shows, in more detail, an antenna for use in the system of FIG. 1.

FIG. 2 shows an antenna 16 formed by three dipoles 30, 31, 32. Each dipole is arranged so that its axis is perpendicular to the axis of the cable 10, and the dipoles are arranged in an array, which array extends parallel to the cable 10. In the arrangement of FIG. 2, the three dipoles 30, 31, 32 are driven from a common power supply 33, which is controlled by a suitable control unit 34 so that the magnetic field component along the length of the cable 10 varies such that its line integral is non-zero. As an alternative, it is possible for the dipoles 30, 31, 32 to have separate power supplies, which are individually controlled to permit control of the phase of the electromagnetic field.

A polarisation discriminator 26 is provided at location B, downstream of location A on the cable 10. The discriminator 26 can thus detect the modified polarisation of light carried by the fiber optic cable at a site remote from location A. A signal is sent by the polarisation discriminator to a signal processing unit 20, which also receives a signal indicating the modification of polarisation generated by the signal generator 18 at location A. The transmission of the information from the signal generator 18 to the signal processor unit 20 may occur by radio waves.

The signal processing unit 20 compares the signal applied to the fiber optic cable 10 at site A, which is generated by signal generator 18, with the signal received from the polarisation discriminator 26 at site B. In this way, the apparatus can indicate whether the correct cable has been identified and located.

In the above discussion of FIG. 1, it is assumed that the laser source 22 reduces plane polarised light. However, as has previously been mentioned, the state of polarisation of the light may vary along the cable 10, and it is possible for the light at location A to be circularly polarised. If this were to happen, the rotation of the polarisation of the light could not be detected. A second embodiment of the invention therefore proposes that the state of polarisation of the light be modulated before it reaches location A from the laser 22.

Where a modulator is provided in the apparatus, it may comprise an apparatus known in the art to achieve scrambling of polarisation states in a time-dependent manner. For instance, an apparatus for effecting cyclical or randomly-varying mechanical perturbation, such as axial or bending strain on the fiber, can be employed. Alternatively, an electro-optic or magneto-optic modulator with a time-varying electrical drive signal can be used. In a further alternative, the drive signal from the signal generator 28 to the laser source 22 can be modulated at a low speed, so that its output frequency is changed with time. Such a modulator is particularly suitable for use with very long optical fibers 10, which intrinsically exhibit the property of wavelength-dependent birefringence. In this way, the polarisation states of the cable are modulated. The effect of this modulation is to reduce fading of the detected signals.

Figure 3:
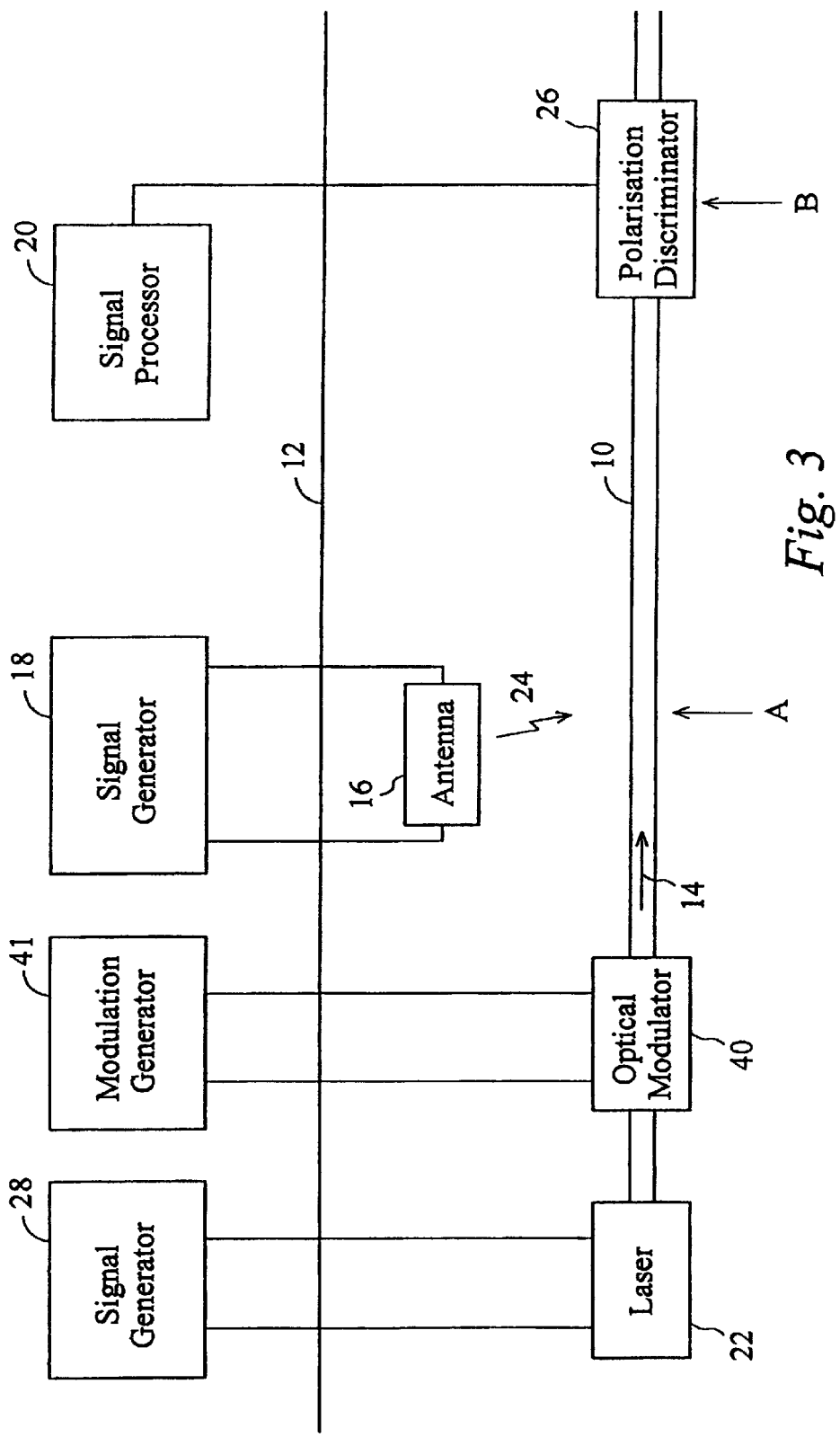
FIG. 3 is a schematic drawing of a second embodiment of a system for modifying the polarisation state of light transmitted through a fiber optic cable.

Thus, in the second embodiment of FIG. 3, an optical modulator 40 is provided which is driven by a modulation generator 41. The optical modulator is positioned between the laser 22 and the location A. Polarisation modulators are, in themselves, well-known and include Pockles-effect electro-optic polarisation modulators, Farraday-effect, magneto-optic polarisation rotators, and mechanical modulators, such as a pair of pi tso-electric devices applying lateral pressure to the fiber in all directions. The result of the modulation achieved by the modulator 40 is that, even at some point in the modulation cycle, the state of polarisation of the light at location A is circularly polarised, it will not be so polarised at other times in the modulation cycle.

Thus, the modulation means (e.g. modulation 40) that the system will also receive a signal for at least part of the time during the complete modulation cycle. In this second embodiment, the polarisation modulator 40 changes the state of polarisation slowly compared to the rate of change of the electro magnetic field that is applied by the antenna 18 at the cable-location testing point. Typically the latter magnetic field may have a frequency between 10 kHz and 200 MHz, more probably in the 10 MHz to 200 MHz region to be above the frequencies associated with ambient mechanical vibrations on the installed fiber cable to be located. Thus the polarisation modulator 40 might typically operate at frequencies from a few Hz to a few kHz, but possibly as high as 100 KHz if high RF frequencies are applied at the location test point. In such an arrangement, the signal processor 20 can readily distinguish the effect of the modulation from the effect of the field applied by the antenna 16. However, if a simplified polarisation discriminator 26 is used, based on a polarisation-selective fiber coupler, or a plane polariser is used to convert polarisation changes to intensity changes, then it may be advantageous also to place a polarisation modulator prior to the polarisation discriminator 26.

A length of high-birefringence fiber may optionally be positioned between the laser 22 and the fiber optic cable 10, so that plane polarised light is transmitted with its plane of polarisation oriented at 45 degrees to the polarisation axes of the fiber. In such an arrangement, controlled birefringence is exhibited that is an intrinsic function of the wavelength of the light.

What is claimed is:

1. A method of identifying a fiber optic cable (10), comprising:

causing a beam (14) of light to pass down the cable (10);

applying an electromagnetic field (24) to the cable at a first site A, thereby to vary the polarisation of the light; and detecting (26) the variation in the polarisation at a second site (B), thereby to identify the fiber optic cable;

characterised in that:

the electromagnetic field is applied by causing said electromagnetic field (24) to traverse the fiber optic with (10) in an essentially transverse direction, the electromagnetic field (24) having a time-varying component orientated along the length of the fiber optic cable (1) at the first site (A), said component varying such that the line integral thereof along the cable (10) is non-zero.

2. A method according to claim 1, wherein the electromagnetic field (24) has a frequency in the range 10 kHz to 200 MHz.

3. A method according to claim 1, wherein the electromagnetic field (24) is transmitted to the fiber optic cable (10) from at least one antenna (16) which is aligned in a plane which is substantially parallel to offset from the longitudinal axis of the cable (10) at the first point (A).

4. A method according to any one of the preceding claims, wherein the state of polarisation of the beam of light (14) is modulated prior to the application of said electromagnetic field to the cable.

5. A method according to claim 4, wherein the frequency of modulation is a factor of at least 10 less than the frequency of electromagnetic field.

6. A method according to claim 4, wherein the beam of light is generated by a light generator (22) to which a modulation signal is applied, thereby to modulate the state of polarisation.

7. A method according to claim 4, wherein the beam of light is generated by a light generator (22) and said state of polarisation is modulated by a modulator (40) which is located between said light generator (22)and said first site (A).

8. An apparatus for identifying a fiber optic cable (10) comprising:

a light generator (22) for causing a beam (14) of light to pass down the cable (10);

an antenna (16) for applying an electromagnetic field (24) to the cable (10) at a first site (A), thereby to vary the polarisation of the light; and a detector (26) for detecting the variation in polarisation at a second site (B), thereby to identify the fiber optic cable (10);

characterised in that:

the antenna is arranged to cause said electromagnetic field (24) to traverse the fiber optic with (10) in an essentially transverse direction, the electromagnetic field (24) having a time-varying component orientated along the length of the fiber optic cable (1) at the first site (A), said component varying such that the line integral thereof along the cable (10) is non-zero.

* * * * *

UNITED STATES PATENT AND TRADEMARK OFFICE
CERTIFICATE OF CORRECTION

PATENT NO.    : 6,480,635 B1
DATED         : November 12, 2002
INVENTOR(S)   : Stuart John Russell et al.

It is certified that error appears in the above-identified patent and that said Letters Patent is hereby corrected as shown below:

<u>Title page,</u>
Item [73], Assignee, should read -- Radiodetection Limited --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,480,635 B1
DATED           : November 12, 2002
INVENTOR(S)     : Stuart John Russell et al.

It is certified that error appears in the above-identified patent and that said Letters Patent is hereby corrected as shown below:

<u>Title page,</u>
Item [57], ABSTRACT,
Line 11, change "(20)" to read -- (26) --.

<u>Column 3,</u>
Line 8, "know" should read -- known --;
Line 11, "a" should read -- an --;

<u>Column 5,</u>
Line 18, "pi tso-electric" should read -- piezo-electric --.

Signed and Sealed this

Twenty-sixth Day of August, 2003

JAMES E. ROGAN
*Director of the United States Patent and Trademark Office*